United States Patent
Halevi et al.

(10) Patent No.: US 9,323,730 B2
(45) Date of Patent: Apr. 26, 2016

(54) PLATFORM AND METHOD FOR REAL-TIME SYNCHRONIZED CO-BROWSING OF WEB PAGES

(71) Applicant: HBR LABS LLC, West Bloomfield, MI (US)

(72) Inventors: Zeev Halevi, Haifa (IL); Ivgeny Rafalovich, Gan Ner (IL)

(73) Assignee: HBR LABS LLC, Farmington Hills, MI (US)

( * ) Notice: Subject to any disclaimer, the term of this patent is extended or adjusted under 35 U.S.C. 154(b) by 240 days.

(21) Appl. No.: 14/018,316

(22) Filed: Sep. 4, 2013

(65) Prior Publication Data

US 2014/0068415 A1   Mar. 6, 2014

Related U.S. Application Data

(60) Provisional application No. 61/696,921, filed on Sep. 5, 2012.

(51) Int. Cl.
  *G06F 17/00* (2006.01)
  *G06F 17/22* (2006.01)
  *G06F 17/30* (2006.01)

(52) U.S. Cl.
  CPC ...... *G06F 17/2247* (2013.01); *G06F 17/30873* (2013.01)

(58) Field of Classification Search
  CPC .......... G06F 17/2247; G06F 17/30873; G06F 17/30867
  See application file for complete search history.

(56) References Cited

U.S. PATENT DOCUMENTS

| | | | |
|---|---|---|---|
| 6,175,808 B1 | 1/2001 | Chai | |
| 6,266,805 B1 | 7/2001 | Nwana et al. | |
| 6,295,550 B1* | 9/2001 | Choung et al. | 709/204 |
| 7,216,351 B1* | 5/2007 | Maes | 719/328 |
| 7,685,631 B1 | 3/2010 | Paya et al. | |
| 7,702,730 B2 | 4/2010 | Spataro et al. | |
| 7,733,366 B2 | 6/2010 | Beavers et al. | |

(Continued)

FOREIGN PATENT DOCUMENTS

| | | |
|---|---|---|
| WO | 2008/102364 | 8/2008 |
| WO | 2014/014965 A1 | 1/2014 |

OTHER PUBLICATIONS

International Search Report, PCT/US2010/29819, Date of Mailing May 24, 2010.

(Continued)

*Primary Examiner* — Laurie Ries
(74) *Attorney, Agent, or Firm* — The Dobrusin Law Firm, P.C.

(57) ABSTRACT

A platform is herein provided, in accordance with some embodiments of the present invention, that allows two or more users to co-browse web pages in real-time using standard modern web browsers. Users' actions such as navigating or scrolling may be fully synchronized for all co-browsing users. According to some embodiments, a system for enabling co-browsing is provided, comprising a first user's web page; a second user's web-page; a Message Bus (MB); wherein the first user's page runs embedded JavaScript code that acts as an Events Synchronizer Module (ESM) such that when the second user page loads, the ESM sends the second user's webpage Document Object Model (DOM) to the MB, and the MB sends the DOM to said first user's ESM.

19 Claims, 3 Drawing Sheets

(56) References Cited

U.S. PATENT DOCUMENTS

| | | | |
|---|---|---|---|
| 8,051,178 B2* | 11/2011 | Skidgel | 709/227 |
| 8,121,413 B2* | 2/2012 | Hwang | G06F 17/30899 382/189 |
| 2001/0037367 A1 | 11/2001 | Lyer | |
| 2002/0029245 A1* | 3/2002 | Nahon et al. | 709/204 |
| 2002/0143859 A1* | 10/2002 | Kuki et al. | 709/203 |
| 2002/0194388 A1* | 12/2002 | Boloker et al. | 709/310 |
| 2003/0005180 A1* | 1/2003 | Schmit | G06F 8/71 719/328 |
| 2003/0018719 A1* | 1/2003 | Ruths | G06F 9/52 709/205 |
| 2003/0041108 A1 | 2/2003 | Henrick et al. | |
| 2003/0046346 A1* | 3/2003 | Mumick et al. | 709/205 |
| 2003/0200114 A1 | 10/2003 | Ogino et al. | |
| 2004/0019539 A1 | 1/2004 | Raman et al. | |
| 2004/0091135 A1 | 5/2004 | Bourg, et al. | |
| 2004/0215564 A1 | 10/2004 | Lawlor et al. | |
| 2004/0243672 A1 | 12/2004 | Markki et al. | |
| 2004/0255235 A1* | 12/2004 | Jung | G11B 27/10 715/203 |
| 2005/0027823 A1* | 2/2005 | Rana | G06F 17/30905 709/219 |
| 2005/0097440 A1 | 5/2005 | Lusk et al. | |
| 2005/0108274 A1 | 5/2005 | Selman et al. | |
| 2005/0108330 A1 | 5/2005 | Sakaguchi et al. | |
| 2005/0114475 A1 | 5/2005 | Chang et al. | |
| 2005/0243924 A1 | 11/2005 | Lecomte et al. | |
| 2006/0000900 A1 | 1/2006 | Fernandes et al. | |
| 2006/0010095 A1 | 1/2006 | Wolff et al. | |
| 2006/0053380 A1 | 3/2006 | Spataro et al. | |
| 2006/0155742 A1 | 7/2006 | Stanev | |
| 2006/0224470 A1 | 10/2006 | Ruano et al. | |
| 2007/0022437 A1* | 1/2007 | Gerken | H04N 7/17318 725/41 |
| 2007/0088707 A1 | 4/2007 | Durgin et al. | |
| 2007/0100834 A1 | 5/2007 | Landry et al. | |
| 2007/0143493 A1 | 6/2007 | Mullig et al. | |
| 2007/0198534 A1* | 8/2007 | Hon | G06F 17/30058 |
| 2007/0207782 A1 | 9/2007 | Tran | |
| 2008/0091750 A1 | 4/2008 | Zadrozny et al. | |
| 2008/0155104 A1* | 6/2008 | Quinn | H04L 67/02 709/227 |
| 2009/0037517 A1* | 2/2009 | Frei | G06F 17/30893 709/202 |
| 2009/0164581 A1* | 6/2009 | Bove et al. | 709/205 |
| 2009/0254529 A1* | 10/2009 | Goldentouch | G06F 17/241 |
| 2009/0271713 A1* | 10/2009 | Stull | G06Q 10/10 715/753 |
| 2010/0037320 A1 | 2/2010 | Moed et al. | |
| 2010/0257451 A1* | 10/2010 | Halevi et al. | 715/733 |
| 2010/0306642 A1* | 12/2010 | Lowet | G06F 17/30873 715/234 |
| 2010/0306696 A1* | 12/2010 | Groth | G06F 3/0481 715/800 |
| 2011/0137925 A1* | 6/2011 | Baird | G06Q 30/0272 707/758 |
| 2012/0089659 A1* | 4/2012 | Halevi et al. | 709/201 |
| 2013/0024759 A1* | 1/2013 | Yuan | G06F 17/30902 715/205 |
| 2013/0055064 A1* | 2/2013 | Mahmud | G06F 17/30896 715/234 |
| 2013/0111584 A1* | 5/2013 | Coppock | H04L 63/145 726/22 |
| 2014/0012898 A1* | 1/2014 | Mittal | 709/203 |
| 2014/0019870 A1 | 1/2014 | Paniagua et al. | |
| 2014/0019888 A1 | 1/2014 | Paniagua et al. | |
| 2014/0068415 A1* | 3/2014 | Halevi et al. | 715/234 |
| 2014/0122995 A1* | 5/2014 | Beckmann | G06F 17/3089 715/234 |
| 2014/0129622 A1 | 5/2014 | Michaeli et al. | |
| 2014/0281858 A1* | 9/2014 | Yi | G06F 17/2247 715/205 |
| 2014/0304337 A1 | 10/2014 | Michaeli et al. | |
| 2015/0213149 A1 | 7/2015 | Halevi et al. | |

OTHER PUBLICATIONS

International Search Report, PCT/IL2008/00235, Publication Date Feb. 25, 2010.

Visualized Development Tool for Building Coding-Phase Collaborations in Virtual World, Dec. 30, 2009.

ActionScript Vs. JavaScript, Visualized Development Tool, Apr. 2007, http://positionabsolute.net/blog/2007/04/actionscript-vs-javascript.php.

\* cited by examiner

PLATFORM AND METHOD FOR REAL-TIME SYNCHRONIZED CO-BROWSING OF WEB PAGES

CROSS-REFERENCE TO RELATED APPLICATIONS

This application claims priority to Provisional Application Ser. No. 61/696,921 filed Sep. 5, 2012, the contents of which are hereby incorporated by reference.

BACKGROUND OF THE INVENTION

Co-browsing enables two or more individuals, usually remotely located, to use a web browser to interact with web pages together, while seeing the same view in a synchronized manner.

Co-browsing of websites can be very effective in various scenarios, for example in support and sale interactions between company representatives and website visitors. Users can make use of co-browsing to provide better customer support—assisting customers with their visit on the site, or to increase sales—e.g. to discuss product displayed on the site pages. In particular, there is a growing interest for a co-browsing solution that does not require software installation or special plug-ins and only makes use of modern web browsers.

Early co-browsing was achieved by local execution of software that had to be installed on the computer of each participant. More advanced tools didn't have to be installed, but still required local execution of software or at least web-browser plug-ins, extensions, or applets. Most tools were limited to a single user that was able to navigate or led a session, while the other users could only watch.

Some tools provide very limited co-browsing by only synchronizing the page location (URL) of the page that should be shared.

Proxy server based co-browsing solutions have certain important limitations. In general, the proxy server fetches the page and passes a modified version to each user; references (paths, hyperlinks) to the original website are replaced with references to the proxy. When a user navigates the site, the proxy in turn performs the actions on the website and returns the modified pages to each user etc. Proxy serve based solutions generally include the following disadvantages:

Another known solution is Server user-agent access. However, there are websites that do not allow a server ("robot") user-agent to access their site, therefore excluding these sites for the proxy-based co-browsing solution.

Further, in cases where browsing is performed by the proxy's user-agent, cookies are saved on the proxy and not on the user's machine. This means that important cookie-saved information (such as content of shopping basket or preferred language) may be lost when co-browsing users use the page. On sites where cookies are relied on for login, a login done using the proxy server will not be available for the user the next time s/he visits the site using his/her own browser.

Security and pages requiring login often include sensitive data such as user names and login details that need to be transferred through the proxy server and not inputted directly by the user on a browsed website. This is less secure and may be unacceptable in scenarios where higher-security standards required by users.

JavaScript usage often "relies" on pages coming from a certain URL. As references to the original site are replaced with ones to the proxy, these instances will likely result in errors, causing the co-browsing not to be executed correctly.

A solution for co-browsing that answers the limitations of the current methods described above would be advantageous. Such enhanced co-browsing should aim to support automatic synchronization of the browsers' state and content, including frames, portlets, or even content of the form fields and controls.

SUMMARY OF THE INVENTION

A platform is herein provided, in accordance with some embodiments of the present invention, that allows two or more users to co-browse web pages in real-time using standard modern web browsers. Users' actions such as navigating or scrolling may be fully synchronized for all co-browsing users. The platform may support encrypted pages (e.g., accessed via https) as well as pages that require a login. Such a platform can be used, for example, for effectively selling and providing support to website visitors while co-browsing a service provider or merchant's website pages.

According to some embodiments, a system for enabling co-browsing is provided, comprising a first user's web page; a second user's web-page: a Message Bus (MB); wherein the first user's page runs embedded JavaScript code that acts as an Events Synchronizer Module (ESM) such that when the second user page loads, the ESM sends the second user's webpage Document Object Model (DOM) to the MB, and the MB sends the DOM to said first user's ESM.

In further embodiments, the Events Synchronizer Module is obtained from the Message Bus.

In still further embodiments, a first role is played by a first end user who's webpages is being co-browsed, and a second role is played by an agent side who sees what the first end user sees, and can interact with the seen page such that the page that the agent side sees is a duplication of the DOM on the first end user side.

In other embodiments, the system adds to each page that is being co-browsed an Events Synchronizer Module that is downloaded from the Message Bus when the second user visits the first user's web page, such that said Events Synchronizer Module starts running on a page being loaded to create an iFrame in the page with a Javascript sub-module for transmitting all the events through the message bus.

In further embodiments, the Message Bus includes a data structure which consists of a Mailbox corresponding to each unique Session ID, the mailbox containing data sent by the system users.

In other embodiments the agent has a duplicated DOM iframe size that is set to be equal to the size of the first end user's page size, to cause the users' locations to be the same on both sides.

In accordance with some embodiments, a method is provided for enabling co-browsing, comprising: Loading an agent side page with the Agent's ESM, the Agent's ESM communication layer and the Agent's "duplicated DOM iFrame"; embedding the ESM on a remote user's page that is to be co-browsed, such that the embedded ESM creates a substantially invisible communication iFrame on an end user page; loading an ESM communication layer from the MB, by the Communication iFrame; sending the DOM to the ESM communication layer in the communication iFrame, by the ESM on the customer side; sending the DOM to the Message Bus by the ESM communication layer; sending the DOM to the Agent's ESM communication layer, by the ESM communication layer; sending the DOM to the Agent's ESM, by the Agent's ESM communication layer; changing the page based path according to the customer's URL, by Agent's ESM changes; applying the DOM structure to the duplicated DOM iFrame, by the Agent's ESM; and seeing the updated page similar to the customer's page, by the Agent's ESM. Further, both or multiple users may fully Co-browse.

According to some embodiments, a platform is provided for real time co-browsing, comprising: a first user's web page served by a first web server; a second user's web-page served by a second web server; a Message Bus (MB) associated with each web page being served; and an Events Syncronizer Module embedded in JavaScript code on each web page being served, to syncronize the web pages using a webpage Document Object Model.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1:
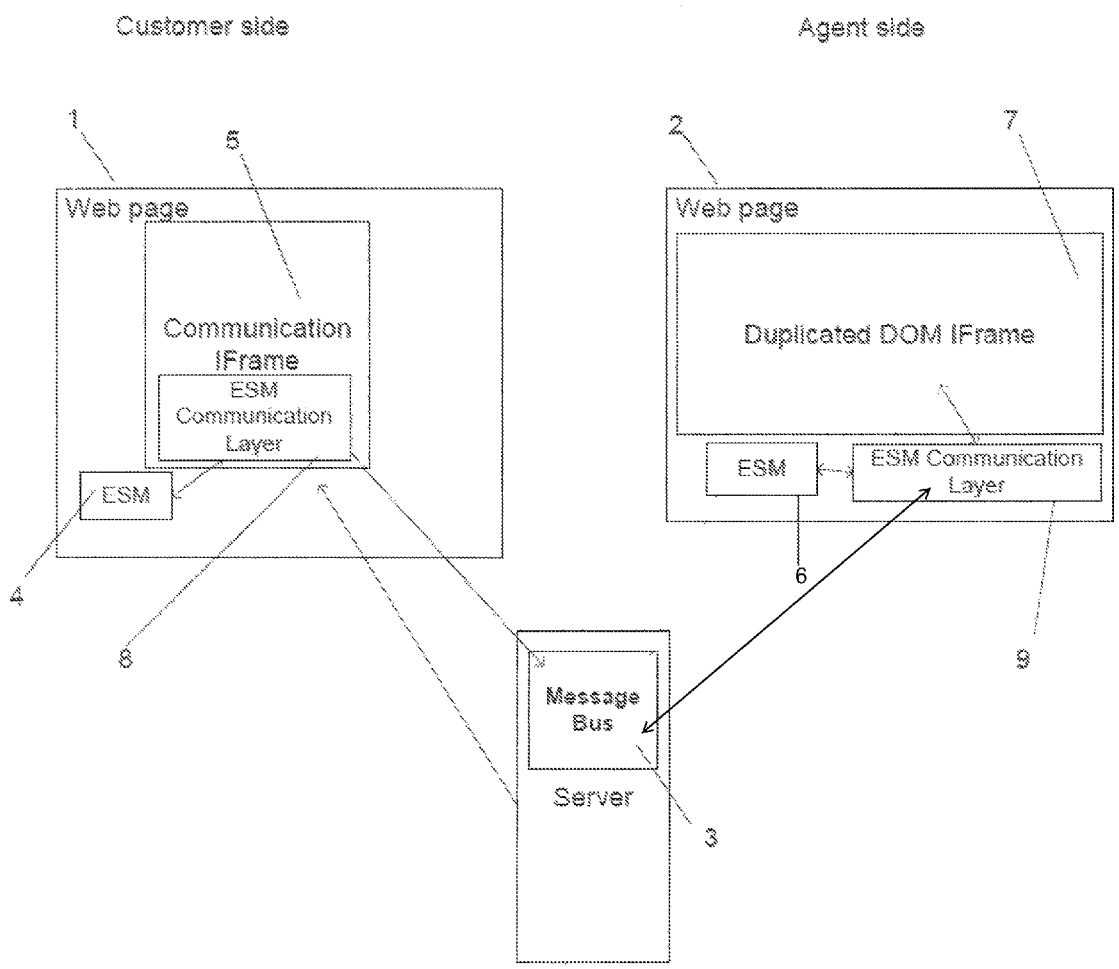
FIG. 1 is a schematic block diagram of the co-browsing platform components recording to some embodiments.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Embodiments of the present invention enable two or more users to co-browse web pages in real-time using standard modern web browsers, such that users' actions such as navigating or scrolling are fully synchronized for all co-browsing users. In some embodiments, the platform may support encrypted pages as well as pages that are behind login.

Reference is now made to FIG. 1 which is a schematic block diagram illustration of the components of the co-browsing platform, according to some embodiment. As can be seen in FIG. 1, the co-browsing platform described herein may include three main elements: User A's web page (FIG. 1, 1), User's B web-page (FIG. 1, 2), and the Message Bus (MB) (FIG. 1,3). The MB is described in more detail below.

In some embodiments JavaScript (JS) code that acts as an Events Synchronizer Module (ESM) (FIG. 1, 4) may be embedded on the page(s) that is to be co-browsed (FIG. 1, 1). When this embedded page loads by the visitor/customer, the embedded ESM (which is obtained from the MB) sends the page's Document Object Model (DOM) to the MB, which then sends it to the agent side ESM (FIG. 1, 6).

In some embodiments, there are two "roles" in the process: the visitor/customer who's pages are being co-browsed, and the agent side who sees what the customer sees, and can interact with this page (e.g., click on links, fill fields etc.), such that the page that the agent sees is a "duplication" of the DOM on the customer side. Of course, the co-browsing may be between any users and not necessarily customers and agents, which are being used herein merely as an example.

In some embodiments, the system requires adding to each page that is being co-browsed the ESM that is downloaded from the MB when the customer visits the page. The ESM starts running on page load, and creates an iFrame in the page with a Javascript sub-module: the "ESM communication layer" (loaded from the MB as well) which is responsible for transmitting all the events through the message bus. The ESM "learns" about the content of the page DOM and on various events that happen (e.g. scrolling, fields filling, mouse clicks, zooming in mobile devices etc). Such events are noted and/or recorded, and this information is sent to the ESM communication layer. Subsequently this information is sent to the message bus using a unique session ID.

On the "Agent side" the page includes both an ESM and ESM communication layer. The ESM communication layer receives a "package" of events or DOM structure information, and subsequently applies the structure of the duplicated DOM on the "Duplicated DOM iFrame" that the agent sees. It also receives events and applies them on the Duplicated DOM iFrame that the agent sees. The Duplicated DOM iFrame may occupy for example, 100% of the agent's screen size, or it may be of a smaller size.

In general, both sides or parties, or more if relevant, act as both "sending" and "receiving" entities in the process.

In some embodiments, the agent page "base" tag is set to the URL of the visitor's co-browsed web page in order for the viewed page to be rendered and seen exactly or substantially the same in both sides.

Actions and data related to a customer's clicking, scrolling, key strokes in fields and mouse-position etc, are collected by a customer's ESM that acts as a "listener" to those activities (FIG. 1, 4), and sent to the agent side using the ESM communication layer. The agent's "Duplicated DOM iFrame" is updated according to those actions, resulting in a synchronized co-browsing experience.

The ESM on the agent's page (FIG. 1, 6) "listens" to the agent's actions (e.g. navigation, clicking, scrolling, mouse position). Those events are sent by the ESM to the ESM communication layer and then to the MB. The MB subsequently sends a description of the events to the customer's ESM communication layer, which is subsequently passed to the ESM, which updates the visitor's page. When the new page loads, the process described above of sending the DOM from customer to agent takes place, resulting in the users seeing the same page.

The above process allows the two or more Users to co-browse pages that have been logged in to, including secured (https) pages. The above process may further allow appropriate "native" usage of cookies during co-browsing, as browsing is performed on a users web client rather than on a proxy.

The platform can support more than two users in the same way described above, however, the scenario of two users is used to maintain simplicity.

Figure 2:
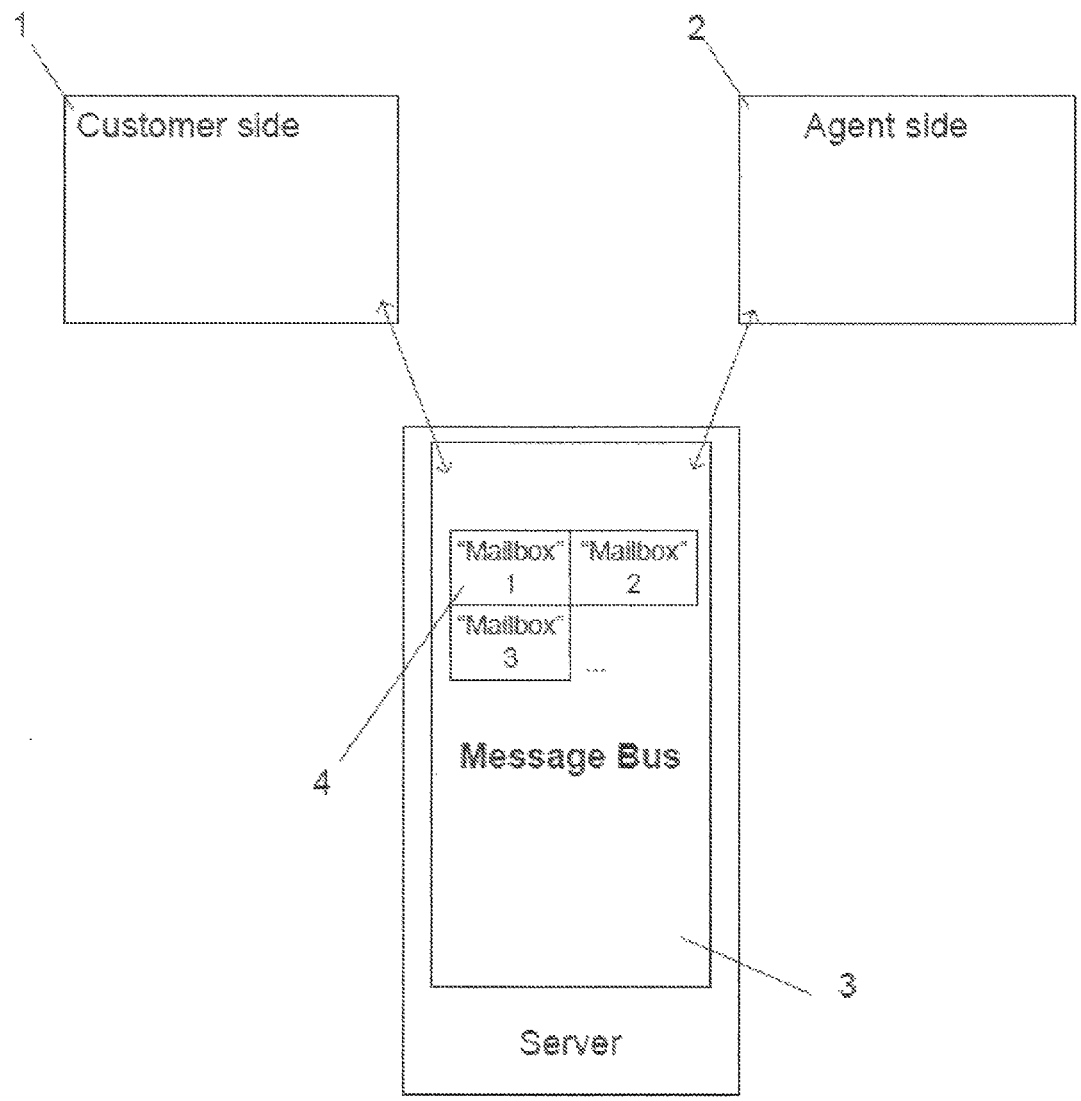
FIG. 2 is a schematic block diagram of the co-browsing platform components, according to further embodiments.

Reference is now made to FIG. 2, which is a schematic block diagram illustration of the components of the co-browsing platform, according to further embodiments. As can be seen in FIG. 2, the co-browsing platform described herein may include the Message bus (MB) FIGS. 1, 3, 2, 3) which makes use of a data structure which consists of "Mailboxes" (FIG. 2, 4), each corresponding to a unique Session ID. The Mailboxes contain the data sent to them by Users. The actions of a customer (FIG. 2, 1) and agent (FIG. 2, 2) are syncronized through the MB, as detailed in the description above. When the data is sent, it consists of a message, which contains the unique Session ID, data, and the User ID for the user who send the message.

When a customer or agent sends data to the MB, the message is kept in the corresponding "Mailbox" according to Session ID and accordingly, the MB sends back messages relevant to the sender.

The data may contain, for example, the DOM (on page load), mouse location (periodically), key strokes in inputfields, scrolling, clicks, and drawings (annotations made "above" the webpage) etc. The JS variables relating to the above are derived from various sources, "zipped" into an encoded long string, and sent periodically to the MB, resulting in a synchronized co-browsing experience.

Figure 3:
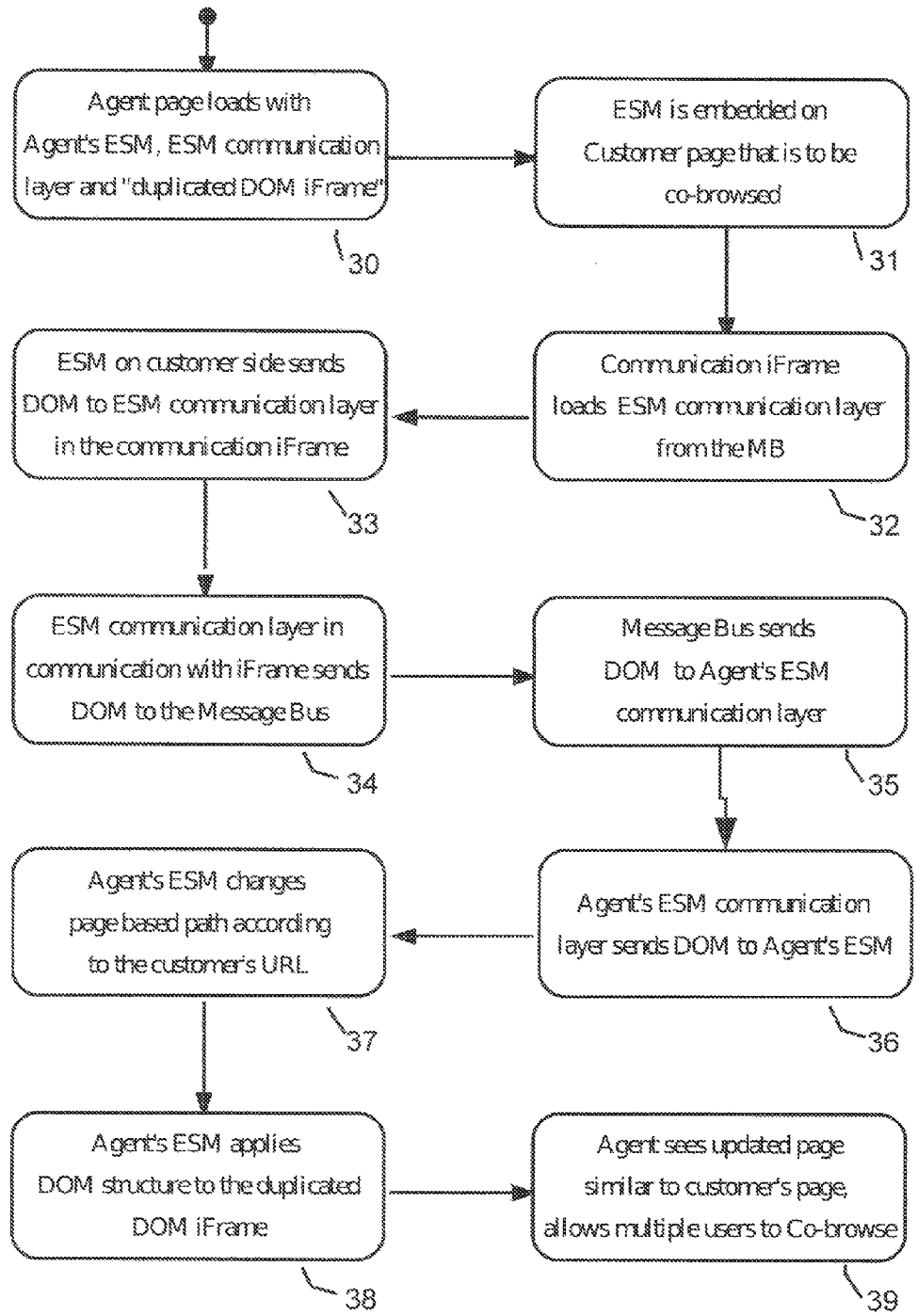
FIG. 3 is a flowchart illustrating an example of a process of co-browsing, according to some embodiments.

FIG. 3 schematically illustrates a series of operations or processes that may be implemented to enable full co-browsing of two or more users. As can be seen in FIG. 3, At step 30, an Agent page loads with the Agent's ESM, the Agent's ESM communication layer and the Agent's "duplicated DOM iFrame". At step 31 the ESM is embedded on the Customer page that is to be co-browsed, such that the embedded ESM creates a substantially invisible communication iFrame on the visitor page. At step 32 the Communication iFrame loads the ESM communication layer from the MB. At step 33 the ESM on the customer side sends the DOM to the ESM communication layer in the communication iFrame. At step 34 the ESM communication layer in communication with the iFrame sends the DOM to the Message Bus. At step 35 the Message Bus sends the DOM to the Agent's ESM communication layer. At step 36 the Agent's ESM communication layer sends the DOM to the Agent's ESM. At step 37 the Agent's ESM changes the page based path according to the customer's URL. At step 38 the Agent's ESM applies the DOM structure to the duplicated DOM iFrame. At step 39 the Agent sees the updated page similar to customer's page, and allows both or multiple users to Co-browse.

In some embodiments, the location of the mouse positions of each user is sent to the other user, and is shown on top of the page so each side can see the other's mouse position.

In some embodiments the agent's duplicated DOM iframe size is set to be equal to the size of the customer's page size, which may cause the mouse locations to be the same on both sides. Of course, any combination of the above steps may be implemented. Further, other steps or series of steps may be used. Further, the co-browsing process above can be between any two users or more than two users, and not necessarily agents and customers, as used above merely as an example.

The foregoing description of the embodiments of the invention has been presented for the purposes of illustration and description. It is not intended to be exhaustive or to limit the invention to the precise from disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A system for enabling co-browsing, comprising:
a first user's web page including a Duplicated DOM iFrame and an Events Synchronization Module (ESM);
a second user's web page including a Communication iFrame and an Events Synchronizer Module (ESM); and
a Message Bus (MB);
wherein said first user's web page runs embedded JavaScript code that acts as the ESM such that when said second user's web page loads a URL including a Document Object Model (DOM), said ESM sends the DOM to the MB; and said MB sends said DOM to said first user's ESM for real time synchronization of the Duplicated DOM iFrame with the Communication iFrame, wherein only the second user's web page obtains the DOM directly from the URL.

2. The co-browsing system of claim 1, wherein said Events Synchronizer Module of the second user is obtained from said Message Bus.

3. The co-browsing system of claim 1, wherein a first role is played by a first end user whose webpage is being co-browsed, and a second role is played by an agent side who sees what said first end user sees, and can interact with said seen webpage such that the webpage that said agent side sees is a duplication of said DOM on said first end user side.

4. The co-browsing system of claim 1, wherein the system adds to the first user's web page that is being co-browsed an Events Synchronizer Module that is downloaded from the Message Bus, such that said Events Synchronizer Module starts running on a page being loaded to create an iFrame in the page with a Javascript sub-module for transmitting all the events through the message bus.

5. The co-browsing platform of claim 4, wherein said agent has a duplicated DOM iframe size that is set to be equal to the size of said first end user's page size, to cause the users' mouse locations to be the same on both sides.

6. The co-browsing platform of claim 1, wherein said Message Bus includes a data structure which includes a Mailbox corresponding to each unique Session ID, said mailbox containing data sent by the system users.

7. The system of claim 1, wherein the first user's web page includes an ESM communication layer outside the Duplicated DOM iFrame.

8. The system of claim 7, wherein the second user's web page includes an ESM communication layer embedded in the Communication iFrame.

9. The system of claim 1, wherein
the first user's web page is an agent's web page having the ESM of the agent's web page in communication with the ESM Communication layer located outside the Duplicated DOM iFrame;
the second user's web page is a client's web page having the ESM of the client's web page in communication with an ESM Communication layer embedded in the Communication iFrame;
wherein the agent's web page runs embedded JavaScript code that acts as the ESM such that when the client's web page loads a Document Object Model (DOM), the client's ESM sends the DOM to the MB; and the MB sends the DOM to the agent's ESM for real time synchronization of the Duplicated DOM iFrame with the Communication iFrame.

10. The co-browsing system of claim 1, wherein
the Events Synchronizer Module of the second user is obtained from said Message Bus;
the system adds to each web page that is being co-browsed an Events Synchronizer Module that is downloaded from the Message Bus, such that the Events Synchronizer Module starts running on a page being loaded to create an iFrame with a Javascript sub-module for transmitting all the events through the message bus;

the Message Bus includes a data structure which includes a Mailbox corresponding to each unique Session ID, said mailbox containing data sent by the system users; and the agent has a duplicated DOM iframe size that is set to be equal to the size of said first user's page size, and to cause a mouse location of the first users and a mouse locations of the second agent to be the same.

11. A method for enabling co-browsing, comprising:

loading an agent's page with an Agent's ESM, an Agent's ESM Communication Layer and an Agent's "duplicated DOM iFrame";

embedding a User's ESM on a remote user's page that is to be co-browsed, such that the embedded User's ESM creates an invisible Communication iFrame on the remote user's page;

loading an User's ESM communication layer from the MB, by the Communication iFrame;

loading a URL including a DOM to the Communication iFrame of the remote user's page;

sending the DOM to the User's ESM communication layer in the Communication iFrame, by the User's ESM;

sending the DOM to the Message Bus by the User's ESM communication layer;

sending the DOM to the Agent's ESM communication layer, by the message bus;

sending the DOM to the Agent's ESM, by the Agent's ESM communication layer; and applying the DOM to the duplicated DOM iFrame, by the Agent's ESM;

wherein the duplicated DOM iFrame is updated to synchronize with the remote user's Communication iFrame;

wherein only the remote user's page loads the URL, and the agent's page obtains a content of the URL including the DOM from the remote user's page.

12. The method of claim 11, further comprising allowing both or multiple users to Co-browse.

13. The method of claim 11, wherein the remote user's ESM runs upon a page being loaded by the remote user's page.

14. The method of claim 13, wherein the agent's page displays duplication of the DOM of the remote user's page.

15. The method of claim 14, wherein the ESM of the remote user's ESM sends a message including a unique session identification and an identification of the agent.

16. The method of claim 14, wherein the Duplicated DOM iFrame has a size that is the same as a size of the remote user's page.

17. The method of claim 14, wherein the remote user's page sends an event selected from a mouse location, a navigation, a key stroke, a scrolling, a click, and a drawing.

18. The method of claim 17, wherein the location of the mouse position of the remote user and the mouse position of the agent are sent to each other and shown on top of the corresponding page so that each of the users can see the other user's mouse position.

19. A platform for real time co-browsing comprising:

a first user's web page served by a first web server and including a Duplicated DOM iFrame and having an Events Synchronization Module (ESM) embedded in JavaScript code;

a second user's web page served by a second web server and including a Communication iFrame and having an Events Synchronizer Module (ESM) embedded in JavaScript code;

a Message Bus (MB) associated with each of the first and second user's web page;

wherein upon loading a URL including a Document Object Model (DOM) in the second user's web page, the ESM of the second user's web page sends the DOM to the first user's web page;

wherein the ESMs serve to synchronize said web pages using the Document Object Model;

and only the second user's web page obtains the DOM directly from the URL.

* * * * *